United States Patent [19]
Akiyama et al.

[11] 4,103,105
[45] Jul. 25, 1978

[54] SWITCHING SIGNAL GENERATOR

[75] Inventors: Masaki Akiyama; Okie Tani, both of Tokyo, Japan

[73] Assignee: Tani Denki Kogyo Kabushiki Kaisha, Tokyo, Japan

[21] Appl. No.: 751,332

[22] Filed: Dec. 16, 1976

[30] Foreign Application Priority Data

Dec. 26, 1975 [JP] Japan ............................. 50-178160[U]
Dec. 26, 1975 [JP] Japan ................................. 50-157459
Dec. 26, 1975 [JP] Japan ................................. 50-157460
Dec. 26, 1975 [JP] Japan ................................. 50-157461

[51] Int. Cl.$^2$ .......................... H04H 1/04; H04M 1/60; H04B 1/00
[52] U.S. Cl. .............................. 179/1 VC; 179/84 VF; 325/55
[58] Field of Search ............... 179/1 VC, 41 A, 41 R, 179/84 T, 84 VF; 325/55, 64, 37, 22, 152; 340/148

[56] References Cited

U.S. PATENT DOCUMENTS

| 3,358,234 | 12/1967 | Stover | 325/478 |
| 3,377,435 | 4/1968 | Lippert | 179/41 A |
| 3,400,392 | 9/1968 | Willcox | 179/41 A |
| 3,610,833 | 10/1971 | Lebegue | 179/41 A |
| 3,714,575 | 1/1973 | Rognlski | 325/55 |
| 3,875,337 | 4/1975 | Bradley | 179/1 VC |

OTHER PUBLICATIONS

R. Hamilton, "Tone Encoder and Pocket Pager", IBM Tech. Discl. Bull., Jun. 1972.

*Primary Examiner*—Kathleen H. Claffy
*Assistant Examiner*—E. S. Kemeny
*Attorney, Agent, or Firm*—Haseltine, Lake & Waters

[57] ABSTRACT

In a press-to-talk system of radio telephone communication, the operator's particular voice signal actuates a switching signal generator to generate a transmit-receive circuit changing signal which connects the circuit of the radio telephone equipment for transmission or for standby. A characteristic tone signal is also generated for each switching changeover of the radio equipment to inform the operator of the switching changeover of the equipment. The press-to-talk manual switch and the pilot lamp for indicating the state of the circuit connection are eliminated, and the operator can use his hands and eyes for other operations while he is using his radio telephone equipment. A feature of the invention is the use of two different frequency tones to indicate equipment mode or logic status by indicating the direction of logic-state change.

3 Claims, 6 Drawing Figures

SWITCHING SIGNAL GENERATOR

FIELD OF THE INVENTION

The present invention relates to a transmit-receive circuit changing switch system for radio telephone equipment, and more particularly to an indicator system for indicating the state of the circuit changing switch in radio telephone equipment.

BACKGROUND

In some circumstances, the operator of radio telephone equipment must perform the necessary communication while he is simultaneously engaged in other activities.

For example, a driver of a vehicle must communicate by his radio equipment while he is steering the vehicle, a worker at a construction or a quarrying site must use his radio telephone equipment while he is doing his job at the site, and a fireman must use his radio telephone equipment while he is engaged in a fire extinguishing operation.

In all these circumstances, the radio operator cannot use his hands or his eyes for the operation of his radio telephone equipment. In the specification of a United States Pat. application No. 688,911/76 filed on May 21, 1976, now U.S. Pat. No. 4,087,636, by the same applicant of the present invention under the title of TRANSMIT-RECEIVE CIRCUIT CHANGING SWITCH SYSTEM, (hereinafter called the prior application) a transmit-receive circuit changing switch system is disclosed in which the circuit changing switch is operated by an electric signal generated from a low-frequency signal produced by the operator's particular voice. Owing to this switch system, the press-to-talk manual switch is eliminated, and the operator's hands are released from the job of operating the manual press-to-talk switch.

Even then, the operator's eyes are engaged in confirming the state of the circuit connection when the state of the circuit connection is indicated by such a visual indicator as a pilot lamp. This will be a substantial handicap for the operator under some circumstances.

BRIEF SUMMARY OF THE INVENTION

Accordingly, the general object of the present invention is to provide a transmit-receive circuit changing system in which an audible tone reply signal is generated for each switching changeover of the radio equipment to inform the operator of the switching changeover.

Another object of the present invention is to provide a tone signal generator which generates a tone of a first frequency for the switching changeover from the standby state to the transmitting state and a tone of a second frequency which is different from the first frequency for the switching changeover from the transmitting state to the standby state.

Still another object of this invention is to provide a radio telephone system in which the tone signals generated for each switching changeover or the tone signal generated for the switching changeover from the transmitting state to the standby state are transmitted through the air to the operator at the remote station to inform, respectively, the end of the speech or of the start and the end of the speech.

For a better understanding of the invention and specific objects attained by its use, reference should be had to the accompanying drawings and descriptive matter in which there are illustrated and described several preferred embodiments of this invention.

DETAILED DESCRIPTION OF THE INVENTION

Figure 1:
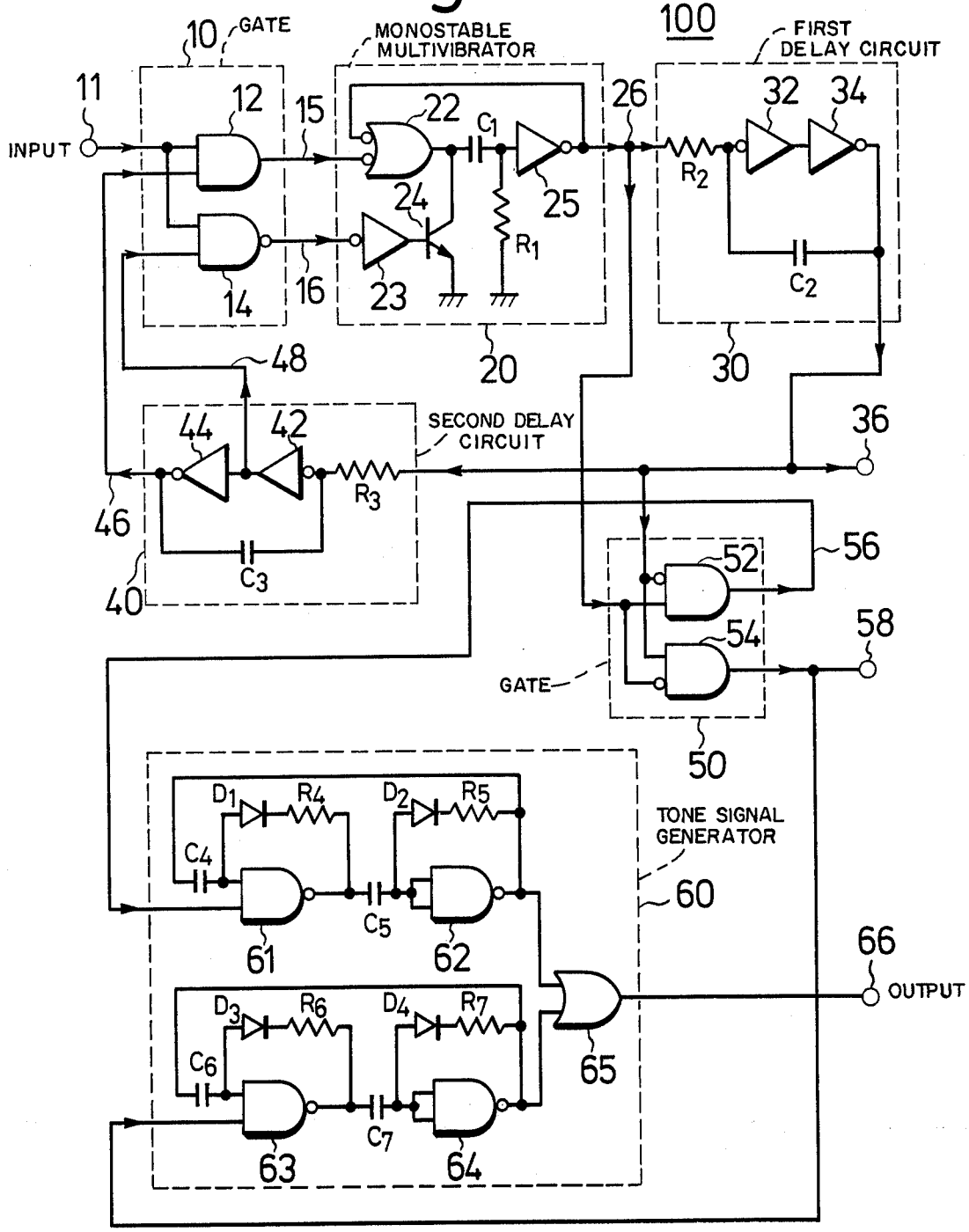
FIG. 1 is a schematic diagram of an embodiment of this invention.

Referring now to the drawings, wherein like reference numerals designate like or corresponding parts throughout the drawings, FIG. 1 illustrates a schematic diagram of an embodiment of this invention.

Reference numeral 100 indicates the whole circuit shown in FIG. 1 which is an illustrative embodiment of a switching signal generator including the tone signal generator of this invention. Reference numeral 11 is the signal input terminal of the switching signal generator 100. Reference numeral 10 is a gate means including two AND gates 12 and 14, and reference numeral 20 indicates a conventional monostable multivibrator which has a set signal input terminal 15 and a reset signal input terminal 16.

Reference numeral 30 is a first delay means and reference numeral 40 is a second delay means. The input terminal of the first delay means 30 is connected to the output terminal 26 of the monostable multivibrator 20. The output signal from the output terminal 36 of the first delay means 30 is the transmit-receive circuit changing signal as described in detail in the prior application. The terminal 36 is also connected to the input terminal of the second delay means 40. The noninverted output of the second delay means 40 from the terminal 46 is connected to an input of the gate 12, and the inverted output of the second delay means 40 from the terminal 48 is connected to an input of the gate 14. Since a monostable multivibrator and delay means are well known and since any conventional type of a monostable multivibrator and delay means other then the type shown in FIG. 1 can be used in the circuit of FIG. 1, no further explanation of the monostable multivibrator 20 and the delay means 30, 40 will be necessary.

As are well known, the duration of the triggered-on state of the monostable multivibrator 20 is determined by the time constant $C_1R_1$, and the delay times of the first delay means 30 and the second delay means 40 are respectively determined by the time constants $C_2R_2$, and $C_3R_3$.

Numeral 50 indicates gate means and numeral 60 indicates a tone signal generator means. The tone signal generator illustrated in FIG. 1 has two oscillator units, each oscillator unit being an astable multivibrator composed of two NAND gates. As an astable multivibrator is well known and as any type of a tone oscillator other than the type shown in FIG. 1 can be used in this invention, no further description on the oscillator will be necessary. And, as are well known, the output frequency from the gate 62 will be determined by the time constants $C_4R_4$ and $C_5R_5$, and the output frequency from the gate 64 will be determined by the time constants $C_6R_6$ and $C_7R_7$.

In one embodiment of this invention, the frequency from the output of the gate 64 is predetermined to have a lower frequency value, for example 400 Hz, and the frequency from the gate 62 is predetermined to have a higher frequency value, for example, 800 Hz. The generated tone signal is delivered through an OR gate 65 to an output terminal 66.

Figure 2:
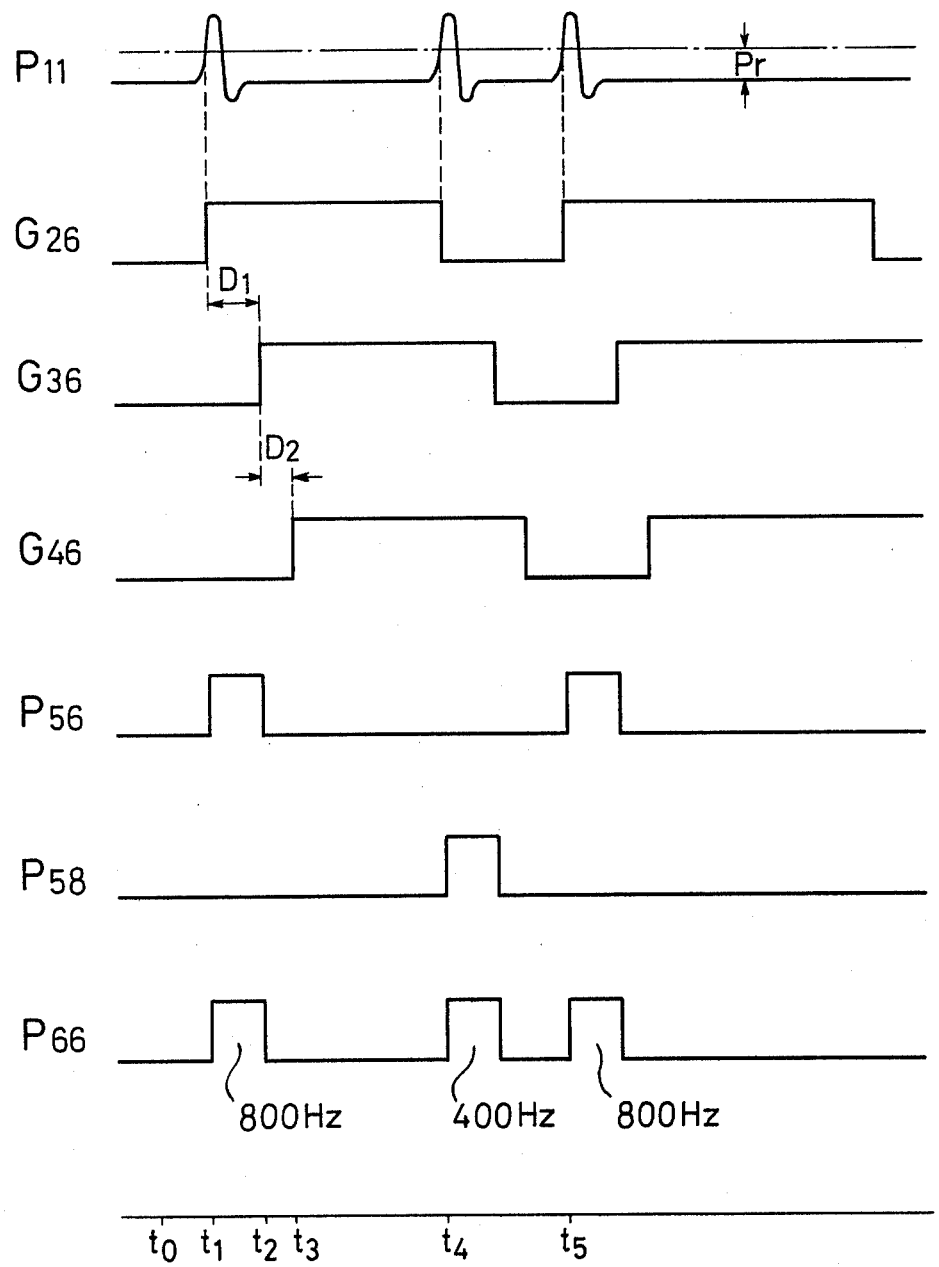
FIG. 2 is a performance time chart of the circuit shown in FIG. 1.

The operation of the circuit shown by FIG. 1 will be explained in connection with the performance time chart as shown in FIG. 2.

$P_{11}$ in FIG. 2 indicates the electric pulse signal generated by a particular voice of the radio telephone operator. The level $P_r$ as shown by the chain line in FIG. 2 indicates the necessary level to trigger the monostable multivibrator 20. The pulse signal $P_{11}$ is sliced in the path to the gate means 10. This slicing of the input signal prevents noise signals from triggering the multivibrator 20. The slicing circuit (not shown in the drawing) may be a conventional comparator circuit which is inserted in the signal path to the input terminal 11 of the gate means 10.

It will be assumed that the signal at the terminal 36 is at logic state "L" and the radio telephone equipment (not shown in FIG. 1) is connected in a standby connection at time $t_o$ (refer to FIG. 2). Then the operator produces a particular voice signal to generate an electric pulse $P_{11}$ at time $t_1$ as shown in FIG. 2. This pulse is delivered through the gate means 10 to the set terminal 15 of the monostable multivibrator 20 turning-on the multivibrator. The signal at the terminal 26 will be at logic state "H" and this signal appears at the terminal 36 after a predetermined time delay of $D_1$. (refer to $G_{26}$ and $G_{36}$ of FIG. 2). The logic state "H" signal at the terminal 36 connects the radio telephone equipment in the transmitting connection.

The signal at the terminal 36 will appear at the terminal 46 after a second predetermined time delay $D_2$ as shown by the waveform $G_{46}$ of FIG. 2. The signal at the terminal 48 is the inverted signal of that at the terminal 46. When the signal at the terminal 46 is at the logic state "H", the signal at the terminal 11 is connected to the reset terminal 16. Delay time $D_2$ is provided in order to prevent the misoperation of the monostable multivibrator 20 by the noise pulse which might be generated in the changeover switching transient of the radio telephone equipment.

AND gate 52 detects the time delay $D_1$ in the first delay means 30 and produces a pulse gate $P_{56}$ as shown in FIG. 2. The pulse gate $P_{56}$ from the terminal 56 controls the AND gate 61, and a tone signal is generated. This tone signal has a frequency of, for example, 800 Hz and informs the operator that his particular voice signal has been verified as the command for the transmit-receive circuit changing and that the circuit connection is about to be changed from the standby to the transmitting connection.

The monostable multivibrator 20 will be automatically reset after a time duration determined by the time constant $C_1R_1$. The operator can reset the multivibrator 20 at any time after the time $t_3$ when the signal at the terminal 46 becomes at the logic "H". In the example as shown by FIG. 2, the operator again generates the pulse signal $P_{11}$ which will be delivered to the reset terminal 16. The multivibrator 20 is reset and the signal at the terminal 26 will be at the logic state "L". The signal at the terminal 26 will appear at the terminal 36 after a time delay $D_1$ and this logic state "L" signal at the terminal 36 connects the radio telephone equipment in the standby connection. The signal at the terminal 36 will appear at the terminal 46 after a time delay $D_2$. AND gate 54 detects the time delay $D_1$ in this operation and produces a pulse gate $P_{58}$ as shown in FIG. 2. The pulse gate $P_{58}$ from the terminal 58 controls the AND gate 63, and a tone signal is generated. This tone signal has a frequency of, for example, 400 Hz and informs the operator that the circuit connection is about to be changed from the transmitting to the standby connection. The tone signal at the terminal 66 of FIG. 1 is, in an embodiment of this invention, transmitted on air to the remote receiving station as will be described later.

In the embodiment shown by FIG. 1, the length of $P_{56}$ gate and that of $P_{58}$ gate are the same, each being identical to the time delay $D_1$. But it will be very easy to design a circuit in which the tone signals are generated at any desired timing and for any desired duration.

Figure 3:
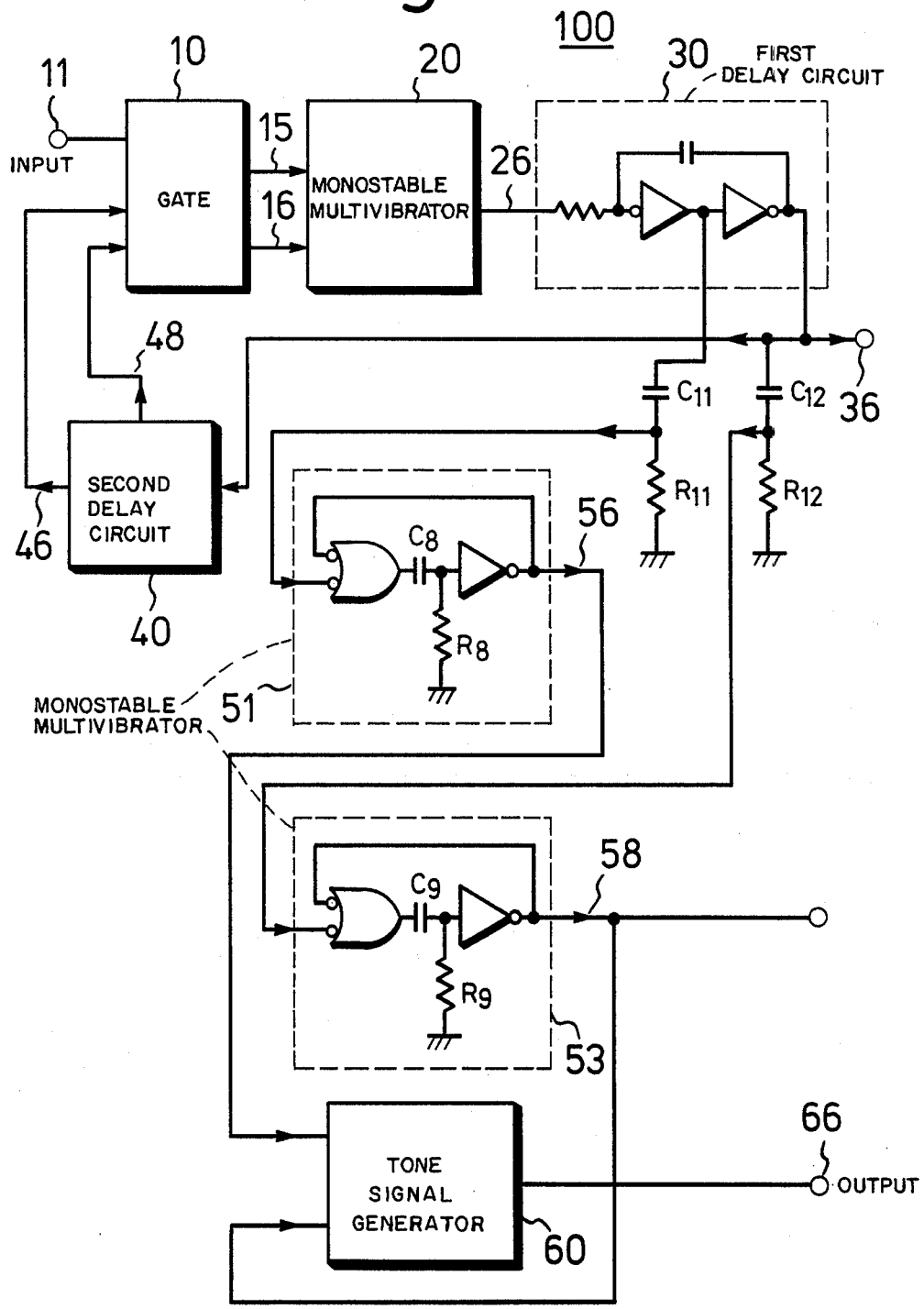
FIG. 3 is a schematic block diagram illustrating another embodiment of this invention.

FIG. 3 is a block diagram illustrating another embodiment of this invention. Referring to FIG. 3, the inverted output from the first delay means 30 is differentiated by a series circuit of $C_{11}$ and $R_{11}$ to generate a pulse at the leading edge of the gate $G_{36}$. This pulse at the leading edge of the gate $G_{36}$ turns-on a monostable multivibrator 51 and generates a pulse gate $P_{56}$ (refer to FIG. 2) on the output terminal 56. The length of $P_{56}$ gate in FIG. 3 is determined by the time constant $C_8R_8$, and the leading edge of $P_{56}$ gate coincides with that of $G_{36}$ gate (different from the relative timing shown in FIG. 2). The noninverted output from the first delay means 30 is differentiated by a series circuit of $C_{12}$ and $R_{12}$ to generate a pulse at the trailing edge of the gate $G_{36}$. This pulse at the trailing edge of the gate $G_{36}$ turns on a monostable multivibrator 53 and generates a pulse gate $P_{58}$ on the output terminal 58. The length of $P_{58}$ gate in FIG. 3 is determined by the time constant $C_9R_9$, and the leading edge of $P_{58}$ gate coincides with the trailing edge of $G_{36}$ gate (different from the relative timing shown in FIG. 2).

The switching signal generator 100 may be built-in the radio telephone equipment, or the switching signal generator 100 may be packaged in a case which is to be attached to a previously manufactured radio telephone equipment. The connections between the switching signal generator 100 and the radio telephone equipment will be different for the different types of the radio telephone equipment.

Figure 4:
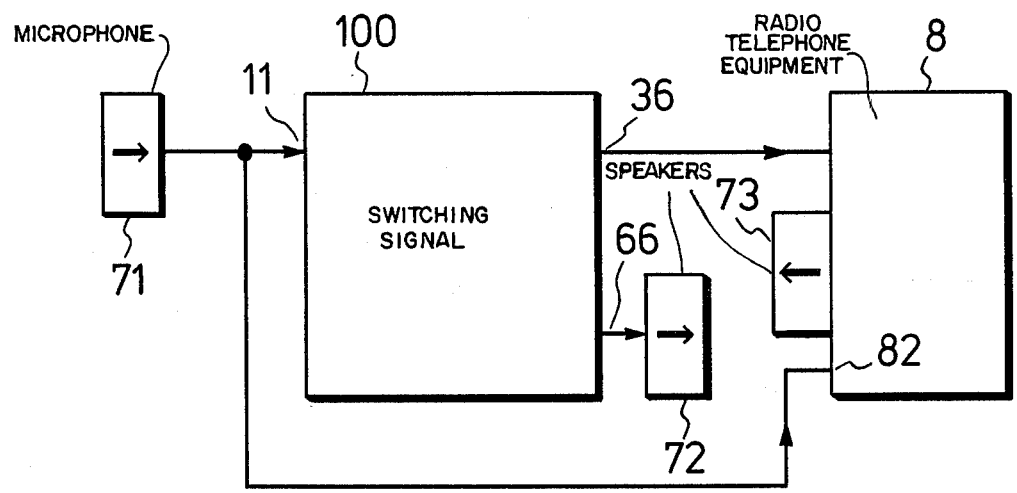
FIG. 4 is a schematic block diagram of a radio telephone system in which the switching signal generator of this invention is incorporated.

FIG. 4 is a schematic block diagram of a radio telephone system in which the switching signal generator of this invention is incorporated. Referring to FIG. 4, numeral 71 is a microphone (an acoustic to electric transducer), and the microphone 71 is used for delivering the speech through a terminal 82 to radio telephone equipment 8 to modulate a radio frequency signal in the equipment 8, and also for transmitting the pulse signal (refer to $P_{11}$ in FIG. 2) to the terminal 11 of the switching signal generator 100 for triggering the monostable multivibrator 20 (refer to FIG. 1). The tone signal delivered from the terminal 66 is transduced to a sound signal by a speaker (an electric to acoustic transducer) 72 which is attached to the switching signal generator 100.

The connection of the radio telephone equipment 8 is controlled by the signal at the terminal 36 (refer to $P_{36}$ in FIG. 2). The signal transmitted through the air and received by the equipment 8 is transduced to a sound signal by a speaker 73 which is attached to the radio telephone equipment 8.

Figure 5:
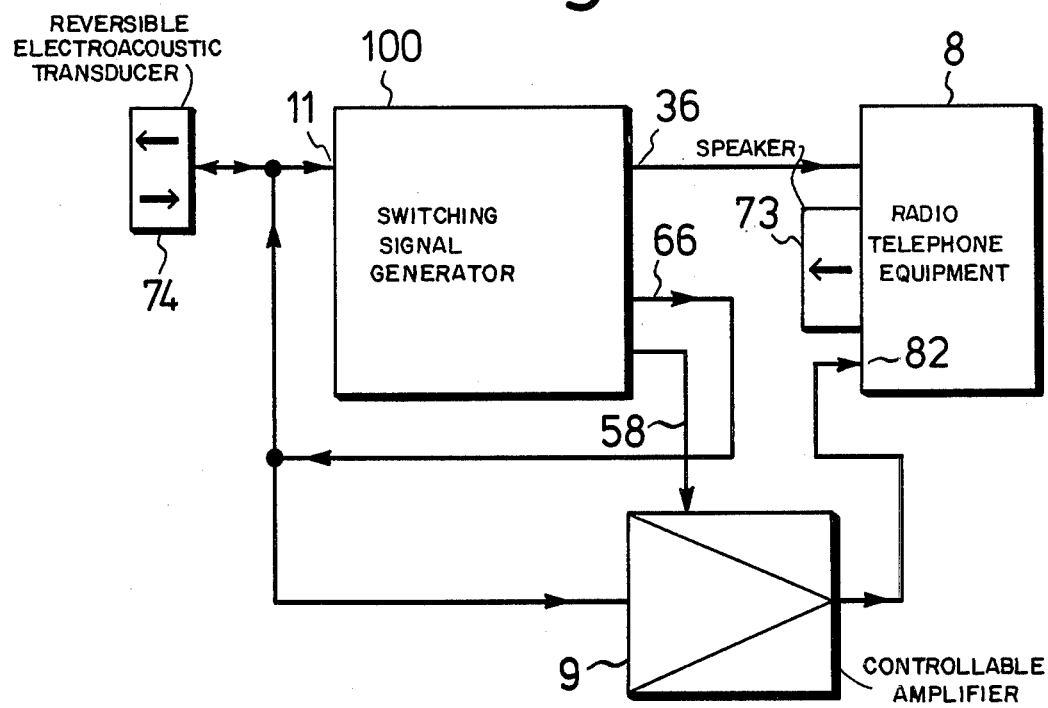
FIG. 5 is another schematic block diagram of a radio telephone system in which the switching signal generator of this invention is incorporated.

FIG. 5 is another schematic block diagram of a radio telephone system in which the switching signal generator of this invention is incorporated, and numeral 9 indicates a controllable amplifier. Numeral 74 is a reversible electroacoustic transducer (which can be used as a microphone and as a speaker), and the electric signal output from the transducer 74 which conveys the communication is fed as the input to the amplifier 9. Although this electric signal is also the input to the switching signal generator 100, this signal will not trigger the monostable multivibrator 20 for the signal has no sufficient peak intensity. The amplified speech signal from the output of the amplifier 9 is fed to the radio telephone equipment through the terminal 82 for modulating the radio frequency signal. The tone signal from the terminal 66 is also fed to the amplifier 9 and the amplified tone signal is fed to the equipment 8 through the terminal 82. When the tone signal controlled by $P_{58}$ gate or the tone signal of a frequency of 400 Hz in the example shown by FIG. 2 is fed to the radio telephone equipment 8, the equipment 8 is in a transmitting connection and the tone of 400 Hz frequency is transmitted through the air to inform the operator at the remote receiving station that his partner's speech is over and that the partner's equipment is now being connected to a standby connection. Since the signal level of the output from the transducer 74 is different from the signal level from the terminal 66, the gain of the amplifier 9 is suppressed by the gate pulse $P_{58}$ (refer to FIG. 2) through the terminal 58. The other operations of the circuit of FIG. 5 are the same with those of FIG. 4 and will need no further description.

Figure 6:
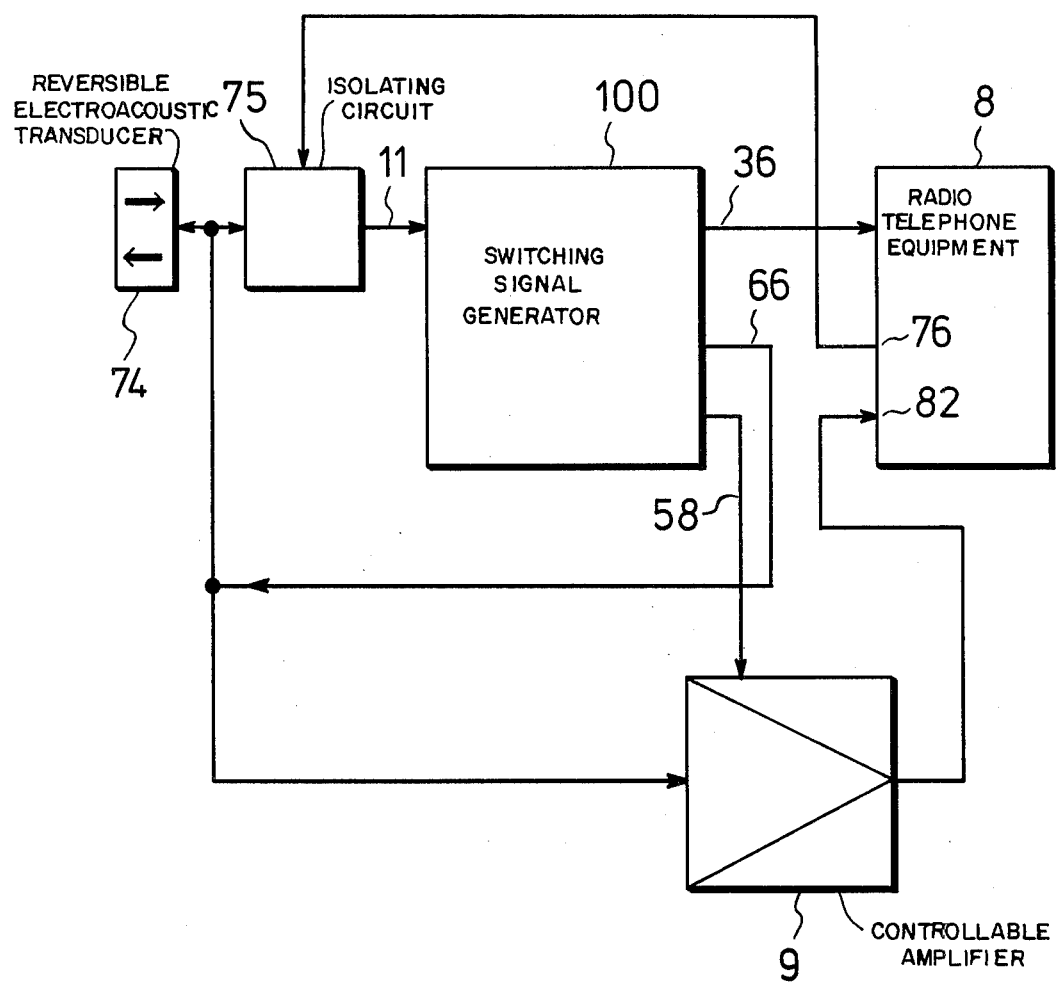
FIG. 6 is still another schematic block diagram of a radio telephone system in which the switching signal generator of this invention is incorporated.

FIG. 6 is still another schematic block diagram of a radio telephone system in which the switching signal generator of this invention is incorporated. As compared with the system shown by FIG. 5, the speaker 73 is eliminated in the system shown by FIG. 6. Numeral 75 in FIG. 6 is an isolating means for isolating an electric signal input to the transducer 74 from an electric signal output of the transducer 74. This isolating means 75 was described in detail in the prior application and will need no further description.

As described in the foregoing, the switching signal generator of this invention can provide the radio telephone operator with a means for changeover switching his radio telephone equipment without using his hands and a means for confirming the switching changeover without using his eyes.

While the invention has been described in their preferred embodiments with a certain degree of particularity with reference to the accompanying drawings, it is to be understood that modifications may be made in the invention without departing from the spirit and scope thereof.

What is claimed is:

1. Switching signal generator for transmit-receive circuit changing of radio telephone equipment comprising:

an electroacoustic transducer for generating an electric pulse signal from an acoustic pulse signal produced by a particular vocalization of said operator;

regenerative switching circuit means, the output logic state of said regenerative switching circuit means being changed from one logic state to another logic state by said electric pulse signal; and tone signal generator means for generating two characteristic tone signals for a predetermined duration indicating the changeover of said output logic state, said tone signals being of two mutually different frequencies, one frequency being generated for indicating the changeover of said regenerative switching circuit from the first logic state to the second logic state and the other frequency being generated for indicating the changeover of said regenerative switching circuit from the second logic state to the first logic state.

2. Switching signal generator according to claim 1 wherein at least one of said two mutually different frequencies is transmitted as a modulating signal of the radio frequency of said radio telephone equipment.

3. Switching signal generator according to claim 2 further comprising a controllable amplifier for amplifying said at least one of said two mutually different frequencies, said controllable amplifier being controlled during the time when said at least one of said two mutually different frequencies is in said amplifier.

* * * * *